US012664951B2

(12) United States Patent
Tsubotani

(10) Patent No.: US 12,664,951 B2
(45) Date of Patent: Jun. 23, 2026

(54) DISPLAY DEVICE WITH SWITCHABLE REFRESH RATES

(71) Applicant: Sharp Display Technology Corporation, Kameyama City (JP)

(72) Inventor: Masashi Tsubotani, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/911,422

(22) Filed: Oct. 10, 2024

(65) Prior Publication Data

US 2025/0157421 A1 May 15, 2025

(30) Foreign Application Priority Data

Nov. 10, 2023 (JP) ................................ 2023-192486

(51) Int. Cl.

*G09G 3/34* (2006.01)
*G09G 3/20* (2006.01)
*G09G 3/36* (2006.01)
*G09G 3/32* (2016.01)

(52) U.S. Cl.

CPC ........... *G09G 3/342* (2013.01); *G09G 3/2092* (2013.01); *G09G 3/3648* (2013.01); *G09G 3/32* (2013.01); *G09G 2320/0233* (2013.01); *G09G 2320/0247* (2013.01); *G09G 2340/0435* (2013.01)

(58) Field of Classification Search

CPC ..... G09G 3/2092; G09G 3/3406–3426; G09G 3/3648; G09G 2320/0233; G09G 2320/0247; G09G 2320/0435
See application file for complete search history.

(56) References Cited

U.S. PATENT DOCUMENTS

| | | | | |
|---|---|---|---|---|
| 6,900,820 | B2 * | 5/2005 | Kataoka | G09G 3/3648 315/86 |
| 11,250,793 | B1 * | 2/2022 | Chen | G09G 3/3413 |
| 11,615,753 | B2 * | 3/2023 | Lee | G09G 3/3426 345/691 |
| 11,830,446 | B2 * | 11/2023 | Sun | G09G 3/3406 |
| 12,236,906 | B2 * | 2/2025 | Kim | G09G 3/3426 |
| 2002/0021275 | A1 * | 2/2002 | Kataoka | G09G 3/3406 345/102 |
| 2018/0151125 | A1 * | 5/2018 | Lee | G09G 3/3266 |
| 2022/0262324 | A1 * | 8/2022 | Lee | G09G 3/3611 |
| 2024/0054965 | A1 * | 2/2024 | Kim | G09G 3/3426 |

FOREIGN PATENT DOCUMENTS

WO 2017/183125 A1 10/2017

* cited by examiner

*Primary Examiner* — Gene W Lee
(74) *Attorney, Agent, or Firm* — ScienBiziP, P.C.

(57) ABSTRACT

A display device includes a display panel including a liquid crystal panel and a backlight disposed behind the liquid crystal panel, and a controller configured to control luminance of the backlight. The controller is configured to increase or decrease the luminance of the backlight at a time of switching a refresh rate when an image is displayed on the display panel in accordance with an image signal in such a manner that a change in luminance of the display panel before and after the switching with respect to an image signal having the same gray scale falls within a predetermined range.

6 Claims, 12 Drawing Sheets

DISPLAY DEVICE WITH SWITCHABLE REFRESH RATES

CROSS-REFERENCE TO RELATED APPLICATIONS

This application claims the benefit of priority to Japanese Patent Application Number 2023-192486 filed on Nov. 10, 2023. The entire contents of the above-identified application are hereby incorporated by reference.

BACKGROUND

Technical Field

The disclosure relates to a display device.

When a moving picture, a game, or the like is reproduced in a display device, a high refresh rate is required in order to express smooth operation. On the other hand, since power consumption is high at a high refresh rate, power saving is achieved by setting a low refresh rate when a still picture or the like is reproduced.

It is known that when the refresh rate is switched, a luminance change occurs in the display panel. Due to such a luminance change, flickering, called flicker, is visually recognized by the human eye, and display quality is deteriorated.

WO 2017/183125 A1 employs pause driving to save power consumption. The pause driving is control for pausing drive of the display panel when the same image is continuously displayed. WO 2017/183125 A1 discloses control in which, in order to suppress flicker occurring when performing pause driving, a frame period is classified into a scanning frame period in which a liquid crystal panel is driven and a pause frame period in which the liquid crystal panel is not driven, a backlight is turned on in a backlight lighting period set in the scanning frame period and the pause frame period, and the backlight is turned off in other periods.

SUMMARY

However, in the control of WO 2017/183125 A1, the pause frame period changes before and after switching of the refresh rate. This may cause a change in luminance before and after switching of the refresh rate. In view of the above, it is an object of the disclosure to provide a display device capable of suppressing deterioration in display quality at the time of switching a refresh rate.

According to one embodiment, a display device includes a display panel including a liquid crystal panel and a backlight disposed behind the liquid crystal panel, and a controller configured to control luminance of the backlight. The controller is configured to increase or decrease the luminance of the backlight at a time of switching a refresh rate when an image is displayed on the display panel in accordance with an image signal in such a manner that a change in luminance of the display panel before and after the switching with respect to an image signal having the same gray scale falls within a predetermined range.

Further details will be described in the embodiments below.

BRIEF DESCRIPTION OF DRAWINGS

The disclosure will be described with reference to the accompanying drawings, wherein like numbers reference like elements.

DESCRIPTION OF EMBODIMENTS

Figure 1:
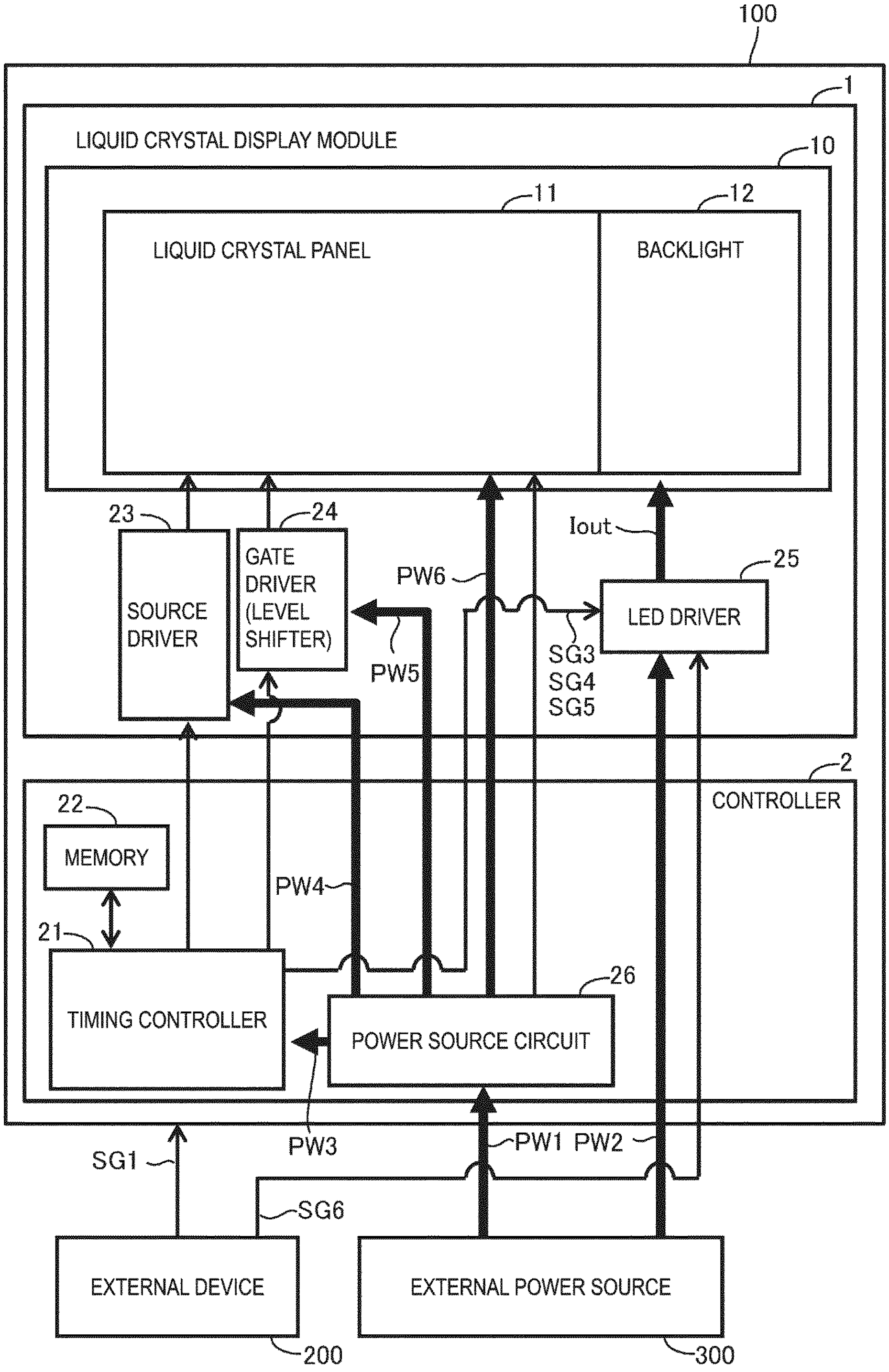
FIG. 1 is a diagram schematically illustrating a configuration of a display device according to a first embodiment.

1. Outline of Display Device (1) A display device according to an embodiment includes: a display panel including a liquid crystal panel and a backlight disposed behind the liquid crystal panel; and a controller configured to control luminance of the backlight. The controller is configured to increase or decrease the luminance of the backlight at a time of switching a refresh rate when an image is displayed on the display panel in accordance with an image signal in such a manner that a change in luminance of the display panel before and after the switching with respect to an image signal having the same gray scale falls within a predetermined range.

When the luminance of the backlight is the same, the luminance of the display panel changes as the refresh rate increases or decreases. In a display device according to an embodiment, at a time of switching a refresh rate, a controller increases or decreases luminance of a backlight in such a manner that a change in luminance of a display panel before and after switching with respect to an image signal having the same gray scale falls within a predetermined range. The "predetermined range" refers to a range of change in luminance to such an extent that flickering (flicker) is not visually recognized by the human eye. More preferably, the change in luminance within the "predetermined range" is 0.

However, the range of the change in luminance need not necessarily be 0 as long as the flickering is not visually recognized by the human eye. Therefore, the range of change in luminance that is the "predetermined range" may be, for example, such that the amount of change in luminance is 1.3% or less of the luminance before the change. More preferably, the range of change in luminance that is the "predetermined range" is such that the amount of change in luminance is 0.3% or less of the luminance before the change. This maintains the luminance of the display device. Therefore, in the display device according to the embodiment, flickering at the time of switching the refresh rate is suppressed, and deterioration in display quality is prevented.

(2) Preferably, in the display device according to (1), increasing or decreasing the luminance of the backlight includes calculating an amount of change in a current value output to the backlight using the refresh rate after the switching. The controller can change the luminance of the backlight in accordance with the refresh rate after switching by calculating the amount of change in the current value output to the backlight using the refresh rate after switching.

(3) Preferably, in the display device according to (1) or (2), increasing or decreasing the luminance of the backlight at the time of switching the refresh rate includes decreasing the luminance of the backlight when the refresh rate increases and increasing the luminance of the backlight when the refresh rate decreases in a case where the refresh rate is switched by changing a pause period of writing an image without changing an operation period of writing the image to each pixel of the liquid crystal panel. In the case where the refresh rate is switched by changing the pause period of writing the image without changing the operation period of writing the image to each pixel of the liquid crystal panel, when the luminance of the backlight is the same, the luminance of the display panel increases as the refresh rate increases, and the luminance of the display panel decreases as the refresh rate decreases. In this case, the controller decreases the luminance of the backlight when the refresh rate increases, and increases the luminance of the backlight when the refresh rate decreases, thereby suppressing a change in the luminance of the display panel that occurs at the time of switching the refresh rate.

(4) Preferably, in the display device according to (1) or (2), increasing or decreasing the luminance of the backlight at the time of switching the refresh rate includes increasing the luminance of the backlight when the refresh rate increases and decreasing the luminance of the backlight when the refresh rate decreases in a case where the refresh rate is switched by changing an operation period of writing an image to each pixel of the liquid crystal panel. In the case where the refresh rate is switched by changing the operation period of writing an image to each pixel of the liquid crystal panel, when the luminance of the backlight is the same, the luminance of the display panel increases as the refresh rate increases, and the luminance of the display panel decreases as the refresh rate decreases. In this case, the controller increases the luminance of the backlight when the refresh rate increases, and decreases the luminance of the backlight when the refresh rate decreases, thereby suppressing a change in the luminance of the display panel that occurs at the time of switching the refresh rate.

(5) Preferably, in the display device according to any one of (1) to (4), the controller is further configured to, after changing the luminance of the backlight, return the luminance of the backlight to an original luminance within a period of the refresh rate after the switching. Thus, in the display device, energy saving can be realized while suppressing flickering at the time of switching the refresh rate.

(6) Preferably, in the display device according to any one of (1) to (5), the controller includes a timing controller configured to control writing of an image to each pixel of the liquid crystal panel based on the image signal. The luminance of the backlight may be controlled by the timing controller.

2. Examples of Display Device

First Embodiment

FIG. 1 is a diagram schematically illustrating a configuration of a display device 100 according to the first embodiment. The display device 100 includes a liquid crystal display module 1 and a controller 2 configured to control the liquid crystal display module 1. The liquid crystal display module 1 includes a display panel 10 and drivers 23 to 25 configured to display an image on the display panel 10. The display panel 10 includes a liquid crystal panel 11 and a backlight 12 disposed behind the liquid crystal panel. The controller 2 controls display on the display panel 10 and also controls luminance.

The liquid crystal panel 11 includes, for example, a thin film transistor (TFT) substrate which is a glass substrate, a color filter substrate, and a liquid crystal layer disposed between the TFT substrate and the color filter substrate. The TFT substrate includes a plurality of gate lines (scanning lines) and source lines (signal lines) disposed to be orthogonal to each other, a TFT disposed near an intersection point of the gate line and the source line, and a pixel electrode connected to the TFT (not illustrated). The liquid crystal display module 1 further includes a source driver 23, a gate driver 24, and an LED driver 25. The gate driver 24 includes a level shifter circuit. Note that the level shifter circuit may be included in a power source circuit 26 described later.

The backlight 12 is disposed on the back face of the liquid crystal panel 11 and emits light toward the liquid crystal panel 11. The backlight 12 includes a plurality of (six-parallel, for example) light emitting diodes (LED). The LED driver 25 is a control unit of the backlight 12. The LED driver 25 outputs an LED current Iout to the LED of the backlight 12.

The controller 2 includes a timing controller 21, a memory 22, and a power source circuit 26. The timing controller 21 is, for example, an integrated circuit.

An image signal SG1 and an enable signal SG6 are input to the display device 100 from an external device 200. The image signal SG1 is input to the timing controller 21, and the enable signal SG6 is input to the LED driver 25. The enable signal SG6 may be input to the LED driver 25 via the timing controller 21.

The timing controller 21 generates a vertical synchronization signal and a horizontal synchronization signal based on the image signal SG1 received from the external device 200. The timing controller 21 supplies a control signal synchronized with the vertical synchronization signal and the horizontal synchronization signal to the gate driver 24. The control signal is a control signal that instructs the gate driver 24 on a voltage (gate ON voltage) to be applied to the gate line as a gate signal and a timing at which the gate ON voltage is applied. The gate ON voltage is a voltage turning on the gate of the TFT of the liquid crystal panel 11.

The timing controller 21 supplies a control signal synchronized with the vertical synchronization signal and the horizontal synchronization signal to the source driver 23. The control signal is a control signal that instructs the source driver 23 on a voltage (source voltage) to be applied to the source line as a source signal and a timing at which the source voltage is applied.

The power source circuit 26 is supplied with a voltage PW1 from an external power source 300. The external power source 300 is, for example, a 3.3 volt power source. The power source circuit 26 is, for example, a power management integrated circuit (PMIC). The power source circuit 26 supplies a voltage PW3 to the timing controller 21. The power source circuit 26 supplies voltages PW4 and PW5 to the source driver 23 and the gate driver 24, respectively. The power source circuit 26 supplies a voltage PW6 to the liquid crystal panel 11.

In accordance with the control signal from the timing controller 21, the gate driver 24 generates a gate signal by converting the voltage PW5 supplied from the power source circuit 26 using a level shifter, and applies the gate signal to the gate line. When the power source circuit 26 includes the level shifter, the voltage PW5 converted into the voltage of the gate signal is supplied from the power source circuit 26 to the gate driver 24. The source driver 23 generates a source signal from the voltage PW4 supplied from the power source circuit 26, and applies the source signal to the source line in accordance with the control signal. Accordingly, data is written in each pixel based on the image signal SG1.

The timing controller 21 analyzes the control signal received together with the image signal SG1 to determine a refresh rate (drive frequency) when an image is displayed on the display panel 10 in accordance with the image signal SG1. The determined refresh rate is stored in the memory 22. Accordingly, the refresh rate determined most recently is stored in the memory 22.

The timing controller 21 switches the frequency of the vertical synchronization signal based on the determined refresh rate. As an example, the timing controller 21 fixes the operation frequency (operation clock) to a predetermined frequency based on the refresh rate and changes the pause period (Blanking).

Figure 2A:
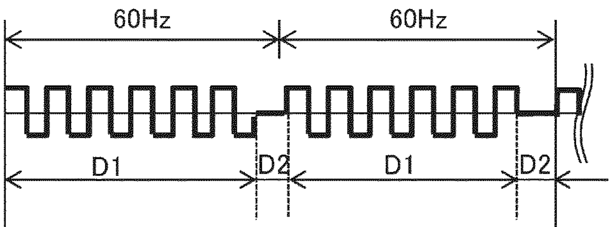
FIG. 2A and FIG. 2B are diagrams each illustrating an example of switching of a refresh rate.
Figure 2B:
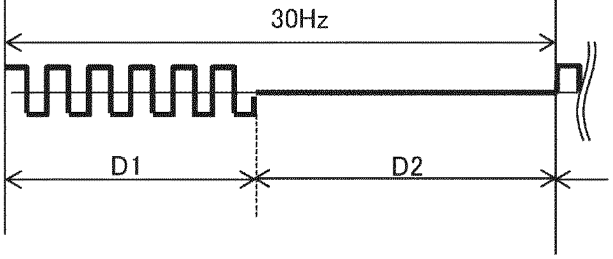

FIG. 2A and FIG. 2B are diagrams each illustrating an example of switching of the refresh rate. A pulse waveform in FIG. 2A represents the operation frequency (operation clock) of the source signal output when the refresh rate is 60 Hz. A pulse waveform in FIG. 2B represents the operation frequency (operation clock) of the source signal output when the refresh rate is 30 Hz. In both FIG. 2A and FIG. 2B, the horizontal direction represents the passage of time. A period D1 represents a period (operation period) in which the source driver 23 applies the source signal to the source line in accordance with the control signal from the timing controller 21, and a period D2 represents the pause period (Blanking).

When the liquid crystal panel 11 has a resolution of 1920×1080 pixels, i.e., a so-called full high-definition display, the operation frequency (operation clock) in the operation period D1 when the refresh rate is 60 Hz is 138.5 MHz. The pause period D2 is 0.466 ms. On the other hand, when the refresh rate is 30 Hz, the timing controller 21 sets the operation frequency in the operation period D1 to 138.5 MHZ, which is the same as when the refresh rate is 60 Hz, while sets the pause period D2 to a period obtained by adding one frame (16.685 ms) to 0.466 ms, which is the pause period D2 when the refresh rate is 60 Hz.

The LED driver 25 supplies current to the backlight 12 in accordance with the enable signal SG6. As an example, the LED driver 25 supplies a current to the backlight 12 when the enable signal SG6 indicates "High", and does not supply a current to the backlight 12 when the enable signal SL indicates "Low". Accordingly, the backlight 12 lights on when the enable signal SG6 is "High", and the backlight 12 turns off when the enable signal SG6 is "Low".

The timing controller 21 transmits a signal SG4 to the LED driver 25 based on the refresh rate. The signal SG4 is, for example, a gate clock signal. In this case, the signal SG4 is repeatedly turned on and off in accordance with the refresh rate. Accordingly, the timing controller 21 notifies the LED driver 25 of the refresh rate.

When the determined refresh rate is different from the refresh rate stored in the memory 22, the timing controller 21 detects switching of the refresh rate. When the timing controller 21 detects the switching of the refresh rate, the timing controller 21 outputs a signal SG5 to the LED driver 25. Transmission of the signal SG5 is, for example, communication synchronized with a clock of I2C (Inter-Integrated Circuit) or the like. Accordingly, the timing controller 21 notifies the LED driver 25 of the switching of the refresh rate.

Figure 3:
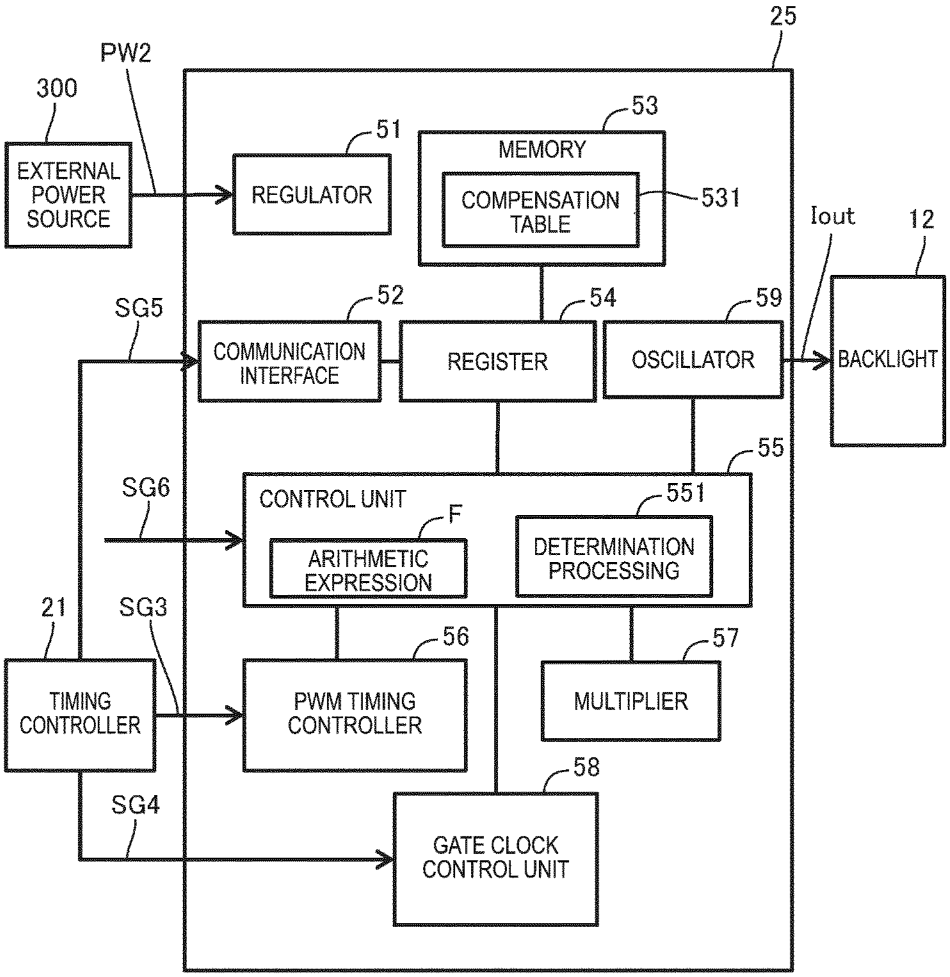
FIG. 3 is a diagram schematically illustrating a configuration of a LED driver included in a controller of the display device according to the first embodiment.

FIG. 3 is a diagram schematically illustrating a configuration of the LED driver 25. A voltage PW2 is supplied to the LED driver 25 from the external power source 300. The voltage PW2 is kept constant by a regulator 51.

The LED driver 25 includes a communication interface 52, a control unit 55, a PWM timing controller 56, a multiplier 57, and a gate clock control unit 58. The PWM timing controller 56 receives an input of a signal SG3 which is a PWM signal from the timing controller 21 and inputs the signal SG3 to the control unit 55. The gate clock control unit 58 receives an input of a signal SG4 which is a gate clock from the timing controller 21 and inputs the signal SG4 to the control unit 55. The communication interface 52 receives an input of a signal SG5 from the timing controller 21 and inputs the signal SG5 to the control unit 55. The enable signal SG6 is input to the control unit 55 from the external device 200.

The LED driver 25 includes a register 54 which is a temporary storage unit. The control unit 55 temporarily stores the signal SG4 in the register 54. Accordingly, the current refresh rate is stored in the register 54.

The LED driver 25 includes an oscillator 59. The output of the regulator 51 is input to the oscillator 59. The oscillator 59 outputs the alternating LED current Iout to the LED of the backlight 12. The control unit 55 turns on or off the LED of the backlight 12.

The LED driver 25 includes a nonvolatile memory 53. The memory 53 is, for example, a multiple time programmable (MTP) memory. The memory 53 stores a set value (current value) of the LED current Iout to be output to the backlight 12. The LED current Iout is an example of a driving amount of the backlight 12. The control unit 55 outputs the LED current Iout to the backlight 12 at the set value stored in the memory 53.

The control unit 55 compensates the set value of the LED current Iout stored in the memory 53 at the timing when the signal SG5 is input from the communication interface 52. Specifically, the control unit 55 compensates the set value of the LED current Iout written from the memory 53 to the register 54 at the timing when the signal SG5 is input, and outputs the LED current Iout to the backlight 12 at the set value after compensation. Accordingly, the luminance of the backlight 12 is changed at the timing when switching the refresh rate.

When the control unit 55 outputs the LED current Iout to the backlight 12 at the set value read from the memory 53 or the compensated set value, the multiplier 57 compensates the current value of each of the plurality of LEDs included in the backlight 12. Accordingly, the control unit 55 outputs the LED current Iout to the backlight 12 at the set current value.

In order to control the luminance of the backlight 12, the control unit 55 executes determination processing 551 to determine a compensation value of the LED current Iout.

The compensation value of the LED current Iout is an example of an amount of change in the driving amount of the backlight 12. In the determination processing 551, the control unit 55 determines the compensation value using the relationship between the difference between the refresh rates and the compensation value stored in advance.

The relationship between the difference in the refresh rate and the compensation value is, for example, an arithmetic expression F for calculating the compensation value from the difference between the refresh rates. In this case, the control unit 55 calculates the compensation value by substituting the difference between the refresh rates into the arithmetic expression F. As another example, the relationship between the difference between the refresh rates and the compensation value may be a compensation table 531 stored in the memory 53 and defining the correspondence between the difference between the refresh rates and the compensation value. In this case, the control unit 55 determines the compensation value by reading the value associated with the difference between the refresh rates from the compensation table 531.

As illustrated in FIG. 2A and FIG. 2B, when the refresh rate is switched, the pause period D2 varies in accordance with the refresh rate. That is, when the refresh rate is switched as illustrated in FIG. 2A and FIG. 2B, the pause period D2 is shorter as the refresh rate is higher, and the pause period D2 is longer as the refresh rate is lower. During the pause period D2, the electric charge applied to the liquid crystal layer in the liquid crystal panel 11 may escape to the members around the liquid crystal layer, and the alignment state of the liquid crystal molecules may gradually change. The longer the pause period D2, the more easily the electric charge escapes. Therefore, the luminance of the display panel 10 is likely to decrease. Therefore, when the luminance of the backlight is the same, the luminance of the display panel 10 increases as the refresh rate increases, and the luminance of the display panel 10 decreases as the refresh rate decreases.

The arithmetic expression F or the relationship between the difference between the refresh rates and the compensation value stored as the compensation table 531 changes the luminance of the backlight 12 so that the change in the luminance of the display panel 10 before and after the switching of the refresh rate falls within a predetermined range. The "predetermined range" refers to a range of change in luminance to such an extent that flickering (flicker) is not visually recognized by the human eye. More preferably, the change in luminance is zero.

Specifically, when the refresh rate increases, the luminance of the display panel 10 increases if the luminance of the backlight 12 is constant, and thus the stored relationship between the difference between the refresh rates and the compensation value decreases the luminance of the backlight 12. More specifically, when the refresh rate increases, the compensation value decreases the set value of the LED current Iout so as to decrease the luminance of the backlight 12. When the refresh rate decreases, the luminance of the display panel 10 decreases if the luminance of the backlight 12 is constant, and thus the stored relationship between the difference between the refresh rates and the compensation value increases the luminance of the backlight 12. More specifically, the compensation value when the refresh rate decreases increases the set value of the LED current Iout so as to increase the luminance of the backlight 12. The absolute value of the compensation value increases as the difference between the refresh rates increases, and decreases as the difference between the refresh rates decreases.

Figure 4:
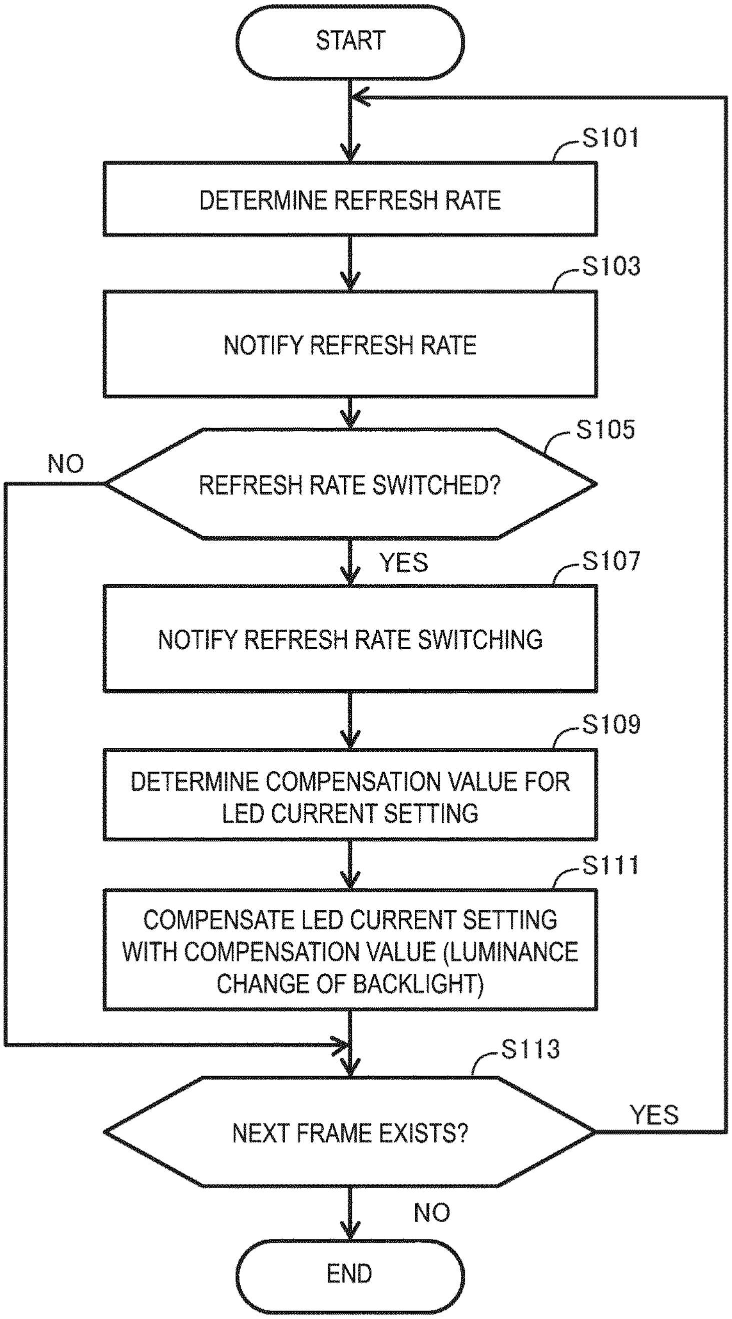
FIG. 4 is a flowchart of an example of a control method of the display device according to the first embodiment.

FIG. 4 is a flowchart of an example of a control method of the display device 100 according to the first embodiment. Upon receiving the image signal SG1 from the external device 200, the timing controller 21 determines the refresh rate using the control signal received together with the image signal SG1 (Step S101). The timing controller 21 determines the refresh rate at a predetermined timing. As an example, the timing controller 21 determines the refresh rate for each frame, but the determination timing of the refresh rate is not limited thereto.

The timing controller 21 transmits the signal SG4, which is a gate clock signal, based on the refresh rate determined in Step S101 to notify the refresh rate (Step S103).

When the refresh rate determined in Step S101 is different from the refresh rate stored in the memory 22, the timing controller 21 detects a change (switching) of the refresh rate (Step S105). Upon detecting the switching of the refresh rate (YES in Step S105), the timing controller 21 transmits the signal SG5 to the LED driver 25 to notify the switching of the refresh rate (Step S107).

The control unit 55 of the LED driver 25 that has received the signal SG5 from the timing controller 21 determines a compensation value (Step S109). In Step S109, the control unit 55 substitutes, into the arithmetic expression F, the difference between the refresh rate stored in the register 54 and the refresh rate indicated by the signal SG4 received from the timing controller 21 at the timing when receiving the signal SG5. The LED driver 25 compensates the set value of the LED current Iout with the compensation value determined in Step S109 and outputs the compensated value to the backlight 12 (Step S111). Accordingly, the luminance of the backlight 12 changes.

When there is a next frame in the image signal SG1 (YES in Step S113), the processing is repeated from Step S101. The above processing is repeated (NO in Step S113), and the processing ends.

Figure 5:
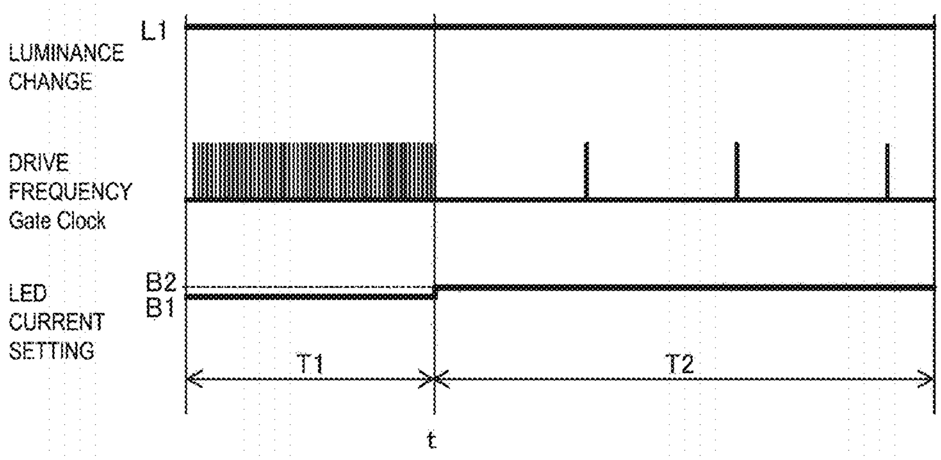
FIG. 5 is a diagram illustrating a change in luminance on a display panel of the display device controlled by the control method according to the first embodiment.
Figure 6:
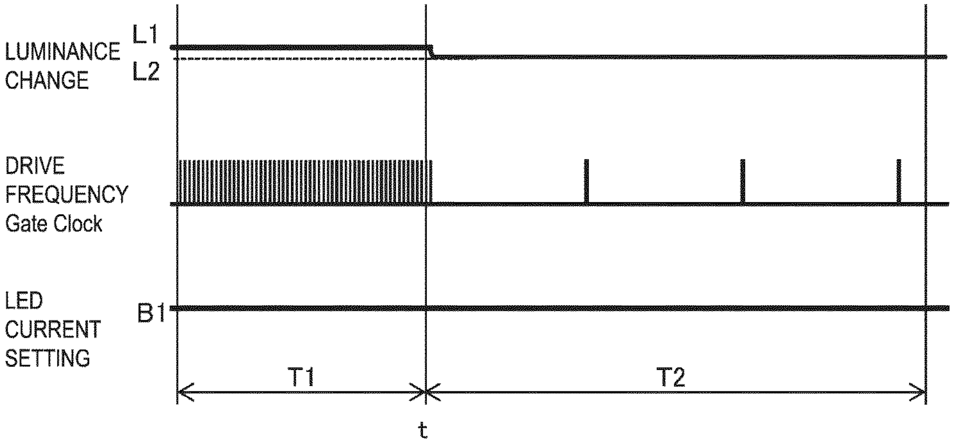
FIG. 6 is a diagram illustrating a change in luminance on a display panel of a display device controlled by a control method according to a comparative example.

FIG. 5 is a diagram illustrating a change in luminance of the display panel 10 in the display device 100 according to the first embodiment. FIG. 6 is a diagram illustrating a change in luminance of a display panel in a display device according to a comparative example in which the set value of the LED current Iout is not compensated.

In FIGS. 5 and 6, a period T1 is a period during which the liquid crystal panel 11 is driven at a high refresh rate (for example, 60 Hz), and a period T2 is a period during which the liquid crystal panel 11 is driven at a low refresh rate (for example, 1 Hz). The horizontal direction represents the passage of time, and the refresh rate is switched from a high refresh rate to a low refresh rate at timing t.

In the display device according to the comparative example (FIG. 6), since the set value of the LED current Iout is not compensated at the timing t, the set value of the LED current Iout is constant at a current value B1 in both the period T1 and the period T2. Therefore, in the display device according to the comparative example, the luminance of the backlight is constant. Since the refresh rate decreases at the timing t, the luminance of the display panel decreases at the timing t. Therefore, the luminance of the display panel of the display device according to the comparative example decreases from a luminance L1 to a luminance L2 at the timing t (L1>L2). In this case, flickering, called flicker, is visually recognized by the eyes of a viewer who views the display device according to the comparative example, and display quality is deteriorated.

On the other hand, in the display device 100 (FIG. 5) according to the present embodiment, compensation for increasing the set value of the LED current Iout is performed at the timing t. Accordingly, the LED current Iout increases from the current value B1 to a current value B2 (B1<B2), and the luminance of the backlight 12 increases. As a result, in the display device 100 according to the present embodiment, at the time of switching the refresh rate, a change in the luminance of the display panel 10 before and after the switching of the refresh rate is within a predetermined range in which flickering (flicker) is not visually recognized by the human eye. Therefore, in the display device 100 according to the present embodiment, flickering at the time of switching the refresh rate is suppressed, and deterioration in display quality is prevented.

Second Embodiment

In a control method of a display device, at a time of switching the refresh rate, the luminance of the backlight 12 is changed in such a manner that a change in the luminance of the display panel 10 before and after the switching falls within a predetermined range in which flickering (flicker) is not visually recognized by the human eye. The compensation value of the LED current Iout may be determined in either the timing controller 21 or the LED driver 25. That is, although the compensation value is determined in the LED driver 25 in the control method according to the first embodiment, the compensation value may be determined in the timing controller 21 as another example.

Figure 7:
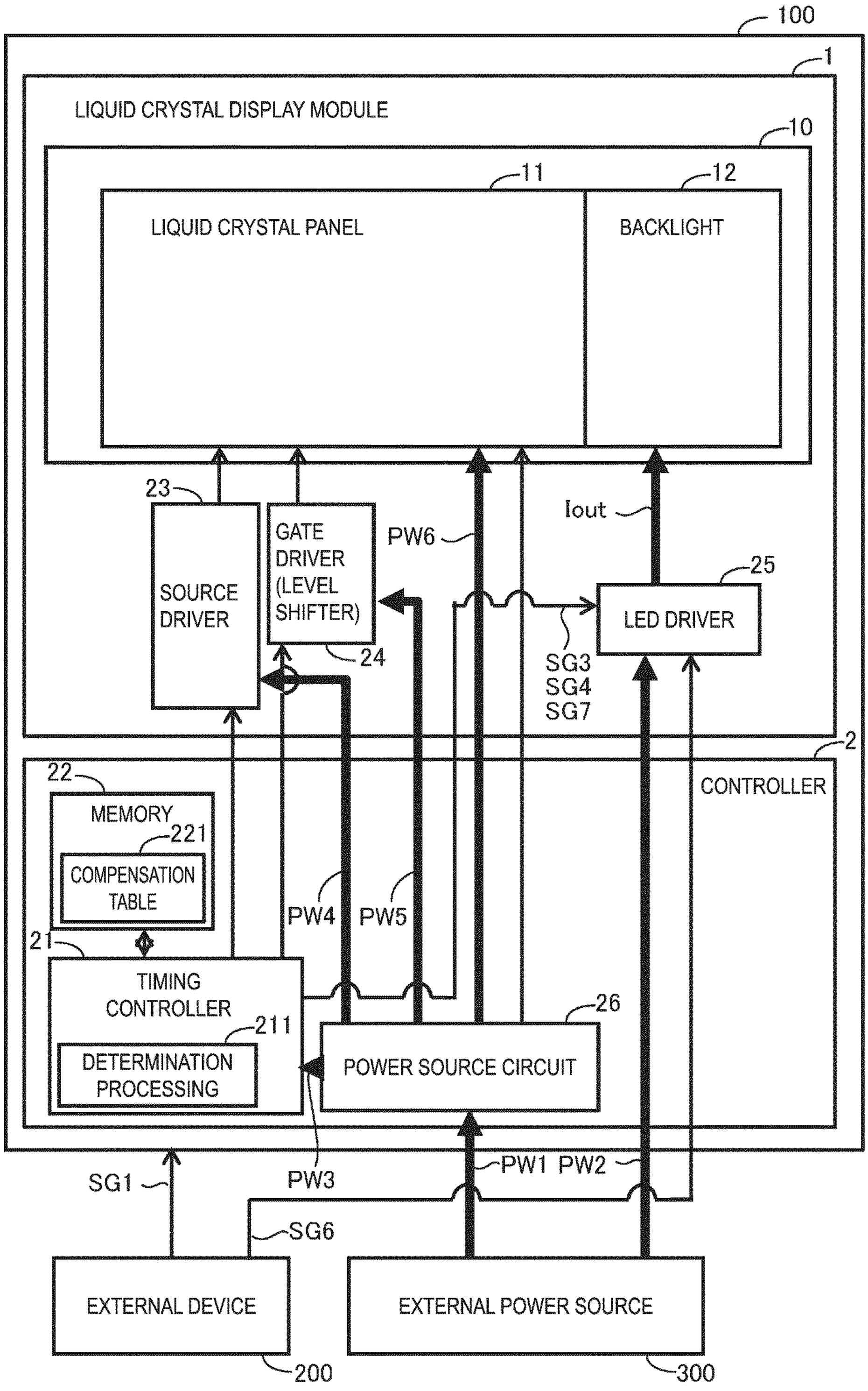
FIG. 7 is a diagram schematically illustrating a configuration of a display device according to a second embodiment.
Figure 8:
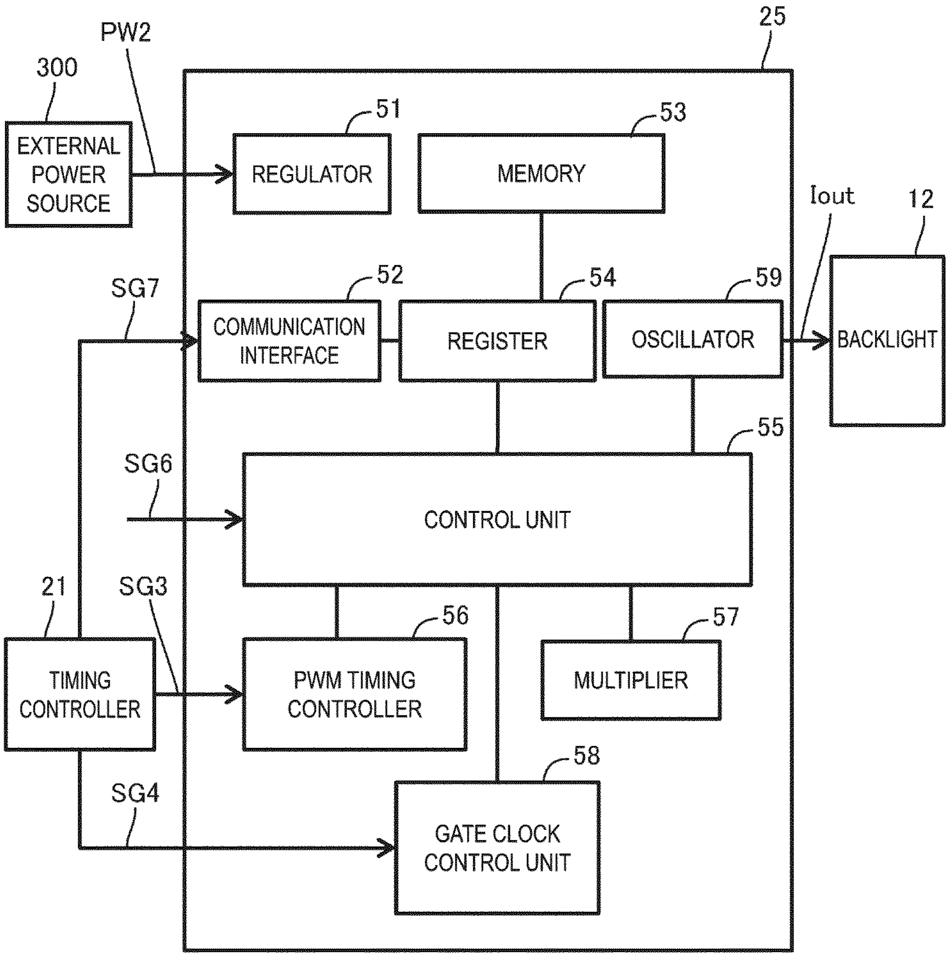
FIG. 8 is a diagram schematically illustrating a configuration of a LED driver included in a controller of the display device according to the second embodiment.

FIG. 7 is a diagram schematically illustrating a configuration of a display device 100 according to the second embodiment. FIG. 8 is a diagram schematically illustrating a configuration of the LED driver 25. The second embodiment is different from the display device 100 (FIGS. 1 and 3) according to the first embodiment in that the timing controller 21 executes determination processing 211 instead of the LED driver 25. The second embodiment is also different in that a compensation table 221 is stored in the memory 22 of the controller 2 instead of the memory 53 of the LED driver 25. The second embodiment is also different in that the timing controller 21 transmits a signal SG7 to the LED driver 25 instead of the signal SG5.

That is, in the display device 100 according to the second embodiment, when the timing controller 21 detects the switching of the refresh rate, the timing controller 21 executes the determination processing 211 to determine the compensation value of the set value of the LED current Iout output from the LED driver 25 to the backlight 12. The determination processing 211 may be similar to the determination processing 551. That is, as an example, the timing controller 21 stores an arithmetic expression for calculating the compensation value from the difference between the refresh rates, and calculates the compensation value by substituting the difference between the refresh rates into the arithmetic expression. As another example, the compensation table 221 in which a correspondence between the difference between the refresh rates and the compensation value is defined may be stored in the memory 22. In this case, the timing controller 21 determines the compensation value by reading the value associated with the difference between the refresh rates from the compensation table 221.

In the display device 100 according to the second embodiment, the timing controller 21 transmits the signal SG7, which is a control signal for compensating the set value of the LED current Iout with the determined compensation value, to the LED driver 25. The transmission of the signal SG7 is, for example, communication synchronized with a clock of I2C or the like. Accordingly, the timing controller 21 instructs the LED driver 25 to compensate the set value of the LED current Iout.

The LED driver 25 compensates the set value of the LED current Iout stored in the memory 53 at the timing when receiving the signal SG5 from the timing controller 21. Accordingly, the luminance of the backlight 12 is changed at the timing when instructed by the timing controller 21.

Figure 9:
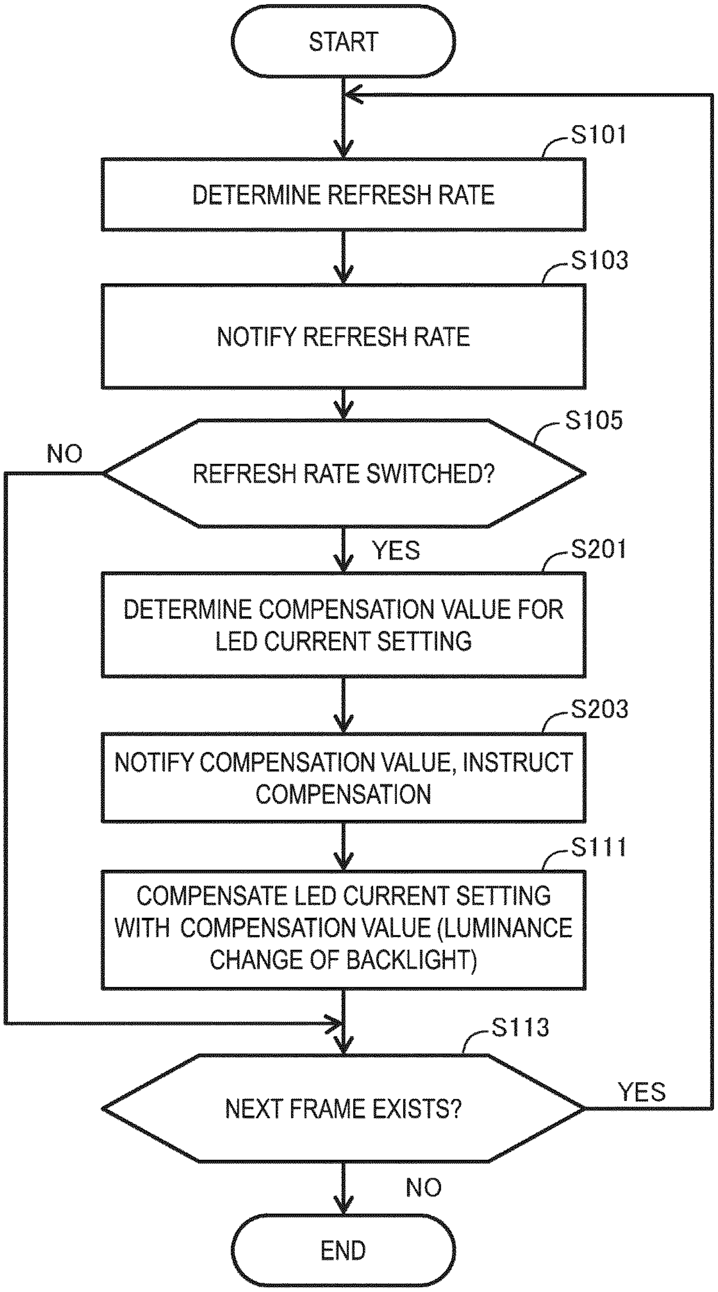
FIG. 9 is a flowchart of an example of a control method of the display device according to the second embodiment.

FIG. 9 is a flowchart of an example of a control method of the display device 100 according to the second embodiment. The control method according to the second embodiment is different from the control method (FIG. 4) according to the first embodiment in that Steps S107 and $109 are replaced with Steps S201 and S203. That is, in the control method according to the second embodiment, when the timing controller 21 detects the switching of the refresh rate (YES in Step S105), the timing controller 21 inputs the difference between the refresh rate stored in the memory 22 and the refresh rate determined in Step S101 into the arithmetic expression to determine the compensation value (Step S201). The timing controller 21 transmits the signal SG7 to the LED driver 25 to notify the LED driver 25 of the compensation value and to instruct the LED driver 25 to compensate the set value of the LED current Iout (Step S203).

The LED driver 25 compensates the set value of the LED current Iout in accordance with the signal SG7 in Step S203 and outputs the compensated value to the backlight 12 (Step S111). Accordingly, the luminance of the backlight 12 changes.

Also in the control method according to the second embodiment, as illustrated in FIG. 5, at the time of switching the refresh rate, the change in the luminance of the display panel 10 before and after the switching of the refresh rate falls within a predetermined range in which flickering (flicker) is not visually recognized by the human eye. Therefore, flickering at the time of switching the refresh rate is suppressed, and deterioration in display quality is prevented.

Third Embodiment

The luminance of the backlight 12 may be changed in a predetermined period (hereinafter, referred to as a "change period") from the time of switching the refresh rate. That is, the control method according to the third embodiment includes changing the luminance of the backlight 12 at the time of switching the refresh rate and returning the luminance to the original luminance within the change period. The change period is at least shorter than the period of the refresh rate after switching. Accordingly, the luminance of the backlight 12 becomes the original luminance after the change period.

Note that a configuration of a display device 100 according to the third embodiment is the same as the configurations of the display device 100 (FIGS. 1 and 3) according to the first embodiment. In this case, the compensation table 531 stored in the memory 53 of the LED driver 25 defines the relationship between the compensation value for the difference between the refresh rates and the change period. Instead of the change period, a change speed may be defined. The control unit 55 of the LED driver 25 determines the compensation value and the change period by reading out the value associated with the difference between the refresh rates from the compensation table 531. The control unit 55 reads out the set change period from the register 54 and performs control in such a manner that the current value of the LED current Iout is gradually changed to the value before compensation in the change period.

The change period may be determined by the characteristics of the liquid crystal panel 11 or the driving method. Preferably, the change period is a period in which the user hardly notices the change in the luminance of the backlight 12. Therefore, preferably, the change period is longer as the compensation value is larger, and is shorter as the compensation value is smaller. Accordingly, it is possible to prevent the luminance of the backlight 12 from rapidly changing, and it is possible to return the luminance to the original luminance without giving a sense of incongruity or discomfort to the user.

Figure 10:
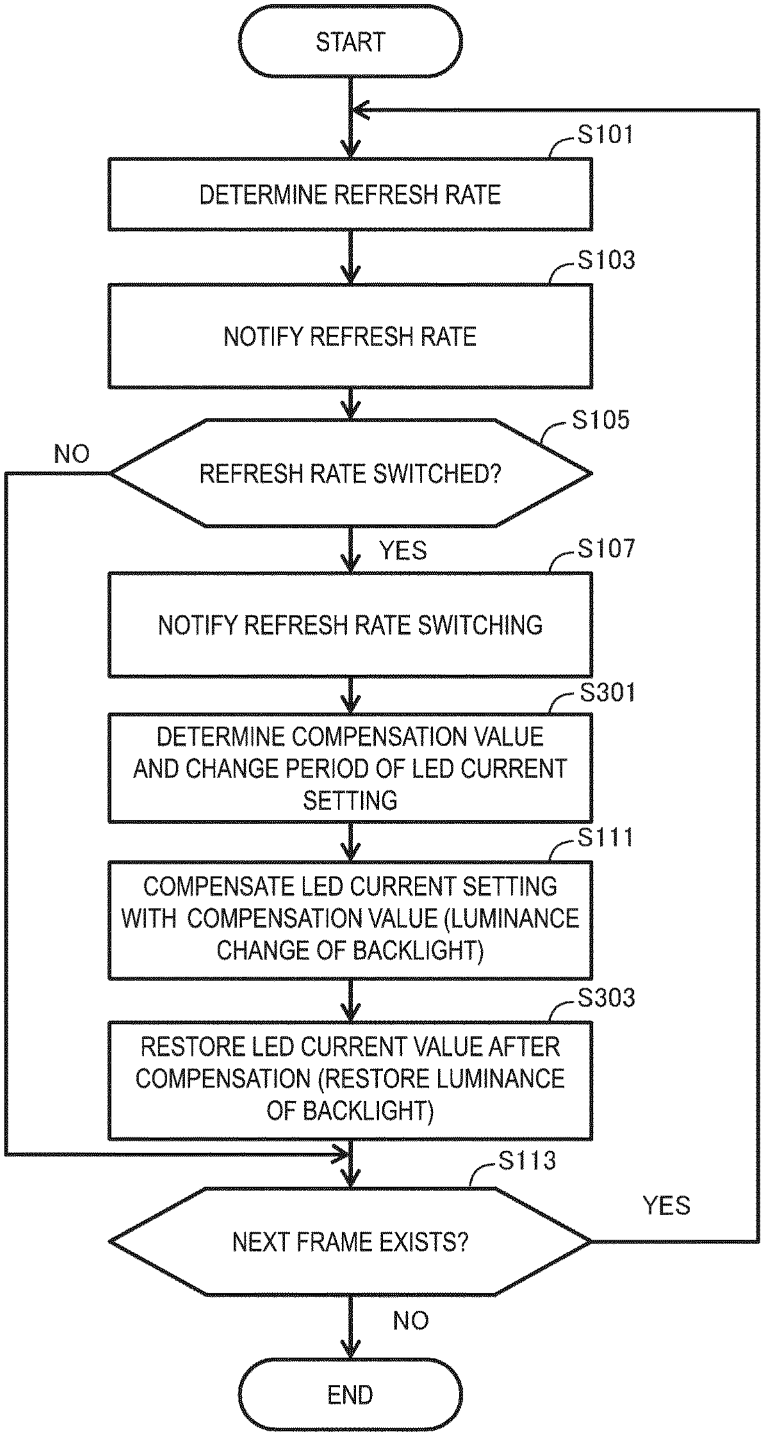
FIG. 10 is a flowchart of an example of a control method of a display device according to a third embodiment.

FIG. 10 is a flowchart of an example of a control method of the display device 100 according to the third embodiment. The control method according to the third embodiment is different from the control method (FIG. 4) according to the first embodiment in that Step S109 is replaced with Step S301 and Step S303 is further included. That is, in the control method according to the third embodiment, when receiving the signal SG5 of Step S107, the control unit 55 of the LED driver 25 reads out, from the compensation table 531, the compensation value associated with the difference between the refresh rate stored in the register 54 and the refresh rate indicated by the signal SG4 received from the timing controller 21 at the timing when the signal SG5 is received. Further, the control unit 55 reads out the change period associated with the difference from the refresh rate (Step S301).

The LED driver 25 compensates the set value of the LED current Iout with the compensation value determined in Step S109 and outputs the compensated value to the backlight 12 (Step S111). Thereafter, the LED driver 25 restores the current value so that the current value of the LED current Iout after compensation becomes the original current value before the compensation in the change period determined in Step S301 (Step S305). Accordingly, the luminance of the backlight 12 returns to the original luminance before compensation after the change period.

Preferably, in Step S305, the LED driver 25 changes the current value of the LED current Iout after compensation to the original current value at a predetermined change speed. The predetermined change speed is a change speed at which a user viewing the display device 100 does not notice the change. Accordingly, the luminance of the backlight 12 changes to the original luminance within the change period at a change speed at which a user viewing the display device 100 does not notice the change.

Figure 11:
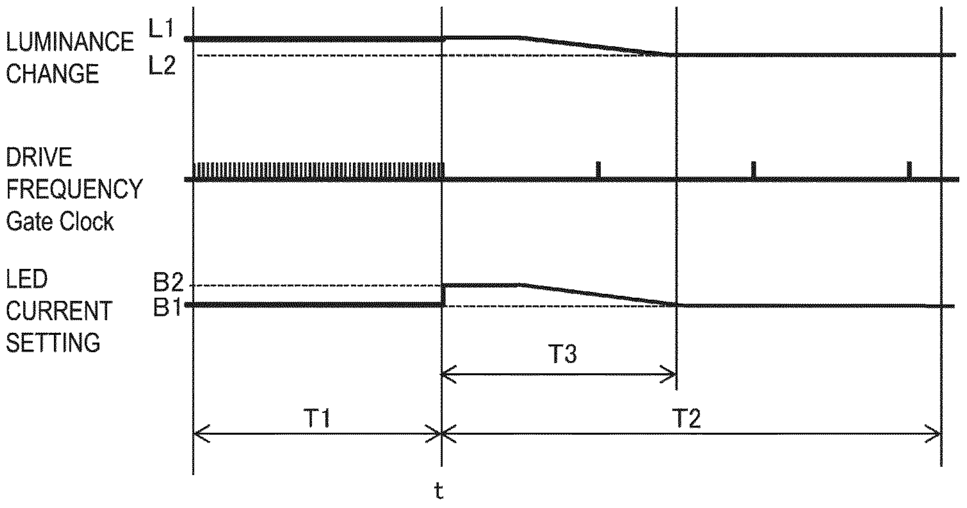
FIG. 11 is a diagram illustrating a change in luminance on a display panel of the display device controlled by a control method according to the third embodiment.

FIG. 11 is a diagram illustrating a change in the luminance of the display panel 10 in the display device 100 controlled by the control method according to the third embodiment. In FIG. 11, the period T1 is a period during which the liquid crystal panel 11 is driven at a high refresh rate (for example, 60 Hz), and the period T2 is a period during which the liquid crystal panel 11 is driven at a low refresh rate (for example, 1 Hz). A period T3 is a change period defined in association with the difference between the refresh rates. The horizontal direction represents the passage of time, and the refresh rate is switched from a high refresh rate to a low refresh rate at timing t.

In the control method according to the third embodiment, similarly to the control method (FIG. 5) according to the first embodiment, compensation is performed to increase the set value of the LED current Iout as the refresh rate decreases at the timing t, and the luminance of the backlight 12 increases. In the control method according to the third embodiment, the current value B2 of the LED current Iout after compensation gradually returns to the original current value B1 before compensation within the period T3 from the timing t. Accordingly, the luminance of the backlight 12 gradually decreases and returns to the original luminance.

By the control method according to the third embodiment, the luminance of the display panel 10 of the display device 100 does not change from the luminance L1 when the high refresh rate is switched to the low refresh rate at the timing t. Therefore, at the timing t, a change in the luminance of the display panel 10 falls within a predetermined range in which flickering (flicker) is not visually recognized by the human eye. Accordingly, flickering at the time of switching the refresh rate is suppressed, and deterioration in display quality is prevented. On the other hand, the luminance decreases as the current value B2 of the LED current Iout after compensation gradually decreases in the period T3, and the luminance decreases to the luminance L2 after the period T3. Accordingly, energy saving can be realized as compared with the case where the current value B2 of the LED current Iout after compensation is maintained.

Since the change in the luminance of the backlight 12 in the period T3 is a change to such an extent that the user hardly notices the change in the luminance, it is possible to suppress a sense of incongruity or discomfort given to the user.

Fourth Embodiment

Figures 12A, 12B:
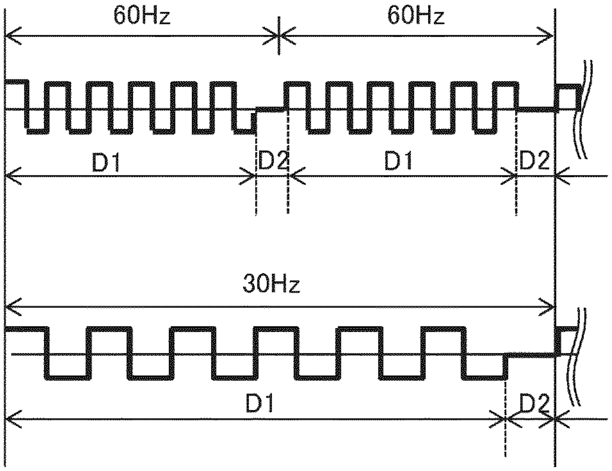
FIG. 12A and FIG. 12B are diagrams each illustrating another example of switching of a refresh rate.

The method of switching the refresh rate illustrated in FIG. 2A and FIG. 2B is an example, and the refresh rate may be switched by another method. FIG. 12A and FIG. 12B are diagrams each illustrating another example of switching of a refresh rate. A pulse waveform in FIG. 12A is identical to the pulse waveform in FIG. 2A, and represents the operation frequency (operation clock) of the source signal output when the refresh rate is 60 Hz. A pulse waveform in FIG. 12B represents the operation frequency (operation clock) of the source signal output when the refresh rate is 30 Hz. In both FIG. 12A and FIG. 12B, the horizontal direction represents the passage of time. A period D1 represents a period (operation period) in which the source driver 23 applies the source signal to the source line in accordance with the control signal from the timing controller 21, and a period D2 represents a pause period.

As another example of switching the refresh rate, the timing controller 21 may change the operation frequency (operation clock). For example, when the liquid crystal panel 11 has a resolution of 1920×1080 pixels, i.e., a so-called full high-definition display, the operation frequency (operation clock) in the operation period D1 when the refresh rate is 60 Hz is 138.5 MHz. On the other hand, when the refresh rate is set to 30 Hz, the timing controller 21 sets the operation frequency in the operation period D1 to half (69.25 MHz) of the operation frequency at 60 Hz. Accordingly, the operation period D1 when the refresh rate is 30 Hz is twice the operation period D1 when the refresh rate is 60 Hz.

The shorter the operation period D1, the shorter the application time of the voltage to the liquid crystal panel 11, and the longer the operation period D1, the longer the application time. In a display device 100 according to the fourth embodiment, the voltage application time becomes shorter as the refresh rate increases, and the voltage application time becomes longer as the refresh rate decreases. When the luminance of the backlight 12 is the same, the display panel 10 has a characteristic that the luminance increases as the voltage application time increases. Therefore, in the display device 100 according to the fourth embodiment, when the luminance of the backlight 12 is the same, the luminance of the display panel 10 increases when the refresh rate decreases, and the luminance of the display panel 10 decreases when the refresh rate increases.

Accordingly, in a control method according to the fourth embodiment, when the same control as the control methods according to the first to third embodiments is performed, the direction of compensation of the LED current Iout of the backlight 12 is reversed. That is, in the control method according to the fourth embodiment, the LED current Iout is compensated to be decreased when the refresh rate is decreased, and the LED current Iout is compensated to be increased when the refresh rate is increased. Accordingly, similarly to the control methods according to the first to third embodiments, the change in the luminance of the display panel 10 that occurs at the time of switching the refresh rate falls within a predetermined range in which flickering (flicker) is not visually recognized by the human eye. As a result, flickering at the time of switching the refresh rate is suppressed, and deterioration in display quality is prevented.

Modified Examples

The control of the luminance of the backlight 12 at the time of switching the refresh rate is not limited to the control performed by changing the current value of the LED current Iout output to the backlight 12. As another example, the luminance of the backlight 12 may be controlled by adjusting the duty ratio of the LED current Iout at the time of switching the refresh rate.

3. Supplementary Note

Note that the disclosure is not limited to the above-mentioned embodiments, and it is possible to make various changes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:
- a display panel including a liquid crystal panel and a backlight disposed behind the liquid crystal panel; and
- a controller configured to control luminance of the backlight,
- wherein the controller is configured to increase or decrease the luminance of the backlight at a time of switching a refresh rate at which an image is displayed on the display panel in accordance with an image signal in such a manner that a change in luminance of the display panel before and after the switching, with respect to the image signal having a particular gray scale, falls within a predetermined range, and
- wherein the controller is further configured to maintain the luminance of the backlight, at an increased or decreased luminance at the time of the switching, during at least a beginning part of a duration from the switching to a next switching of the refresh rate, the duration including an operation period in which the image signal is applied to pixels on the liquid crystal panel.

2. The display device according to claim 1,
- wherein increasing or decreasing the luminance of the backlight at the time of switching the refresh rate includes calculating an amount of change in a current value output to the backlight using the refresh rate after the switching.

3. The display device according to claim 1,
- wherein increasing or decreasing the luminance of the backlight at the time of switching the refresh rate includes decreasing the luminance of the backlight when the refresh rate increases and increasing the luminance of the backlight when the refresh rate decreases in a case that the refresh rate is switched by changing a pause period in which the image signal is not applied to the pixels on the liquid crystal panel without changing the operation period.

4. The display device according to claim 1,
- wherein increasing or decreasing the luminance of the backlight at the time of switching the refresh rate includes increasing the luminance of the backlight when the refresh rate increases and decreasing the luminance of the backlight when the refresh rate decreases in a case that the refresh rate is switched by changing the operation period.

5. The display device according to claim 1,
- wherein the controller is further configured to, after maintaining the luminance of the backlight at the increased or decreased luminance, and before the next switching of the refresh rate, gradually return the luminance of the backlight to an original luminance over the operation period.

6. The display device according to claim 1,
- wherein the controller includes a timing controller configured to control applying the image signal to the pixels on the liquid crystal panel.

* * * * *